United States Patent [19]

Matsuda et al.

[11] Patent Number: 4,858,235
[45] Date of Patent: Aug. 15, 1989

[54] INFORMATION STORAGE APPARATUS

[75] Inventors: Fumio Matsuda; Minoru Ozaki, both of Amagasaki, Japan

[73] Assignee: Mitsubishi Denki Kabushiki Kaisha, Tokyo, Japan

[21] Appl. No.: 136,358

[22] Filed: Dec. 22, 1987

[30] Foreign Application Priority Data

Dec. 25, 1986 [JP] Japan ................................. 61-315095

[51] Int. Cl.⁴ ............................................. G06F 11/10
[52] U.S. Cl. ........................................ 371/38; 371/47
[58] Field of Search ....................... 371/38, 37, 39, 40, 371/47, 5

[56] References Cited

U.S. PATENT DOCUMENTS

| | | | |
|---|---|---|---|
| 4,162,480 | 7/1979 | Berlekamp | 340/146.1 AL |
| 4,525,840 | 6/1985 | Heinz | 371/5 X |
| 4,696,008 | 9/1987 | Takei | 371/5 X |
| 4,747,105 | 5/1988 | Wilson | 371/40 X |

OTHER PUBLICATIONS

Nikkei Electronics No. 21.
Research Publication PRL 73-77 of the Institute of Electronics and Communication Engineers of Japan.
T. Inoue et al., "A New Class of Burst-Error-Correcting Codes and its Application to PCM Tape Recording Systems", 1987 National Telecommunications Conference, 20.6.1-20.6.5, 1978 IEEE.

*Primary Examiner*—Jerry Smith
*Assistant Examiner*—Robert W. Beausoliel
*Attorney, Agent, or Firm*—Fleit, Jacobson, Cohn, Price, Holman & Stern

[57] ABSTRACT

In an information storage apparatus having an error-correcting code, wherein digital information and check symbols are stored in groups of codewords which are divided into blocks of equal size and a synchronization field for data synchronization is added to each block, a detector detects errors in consecutive synchronization fields when the digital information is read, and a flag-setting circuit sets dropout flags when a signal from the detector indicates an error in consecutive synchronization fields. The flags are set from the last synchronization field that is correctly detected before the error up to the first synchronization field that is correctly detected after the error. In decoding the codewords, the errors in them are corrected with reference to the dropout flags.

2 Claims, 5 Drawing Sheets

INFORMATION STORAGE APPARATUS

BACKGROUND OF THE INVENTION

This invention relates to a digital information storage apparatus with means for correcting errors, more particularly to a method of generating dropout flags to enhance the effectiveness of an error-correcting code.

Correction of errors in digital information read from an information storage apparatus in enabled by storing the information in an encoded form, consisting of groups of codewords in a format such as shown in FIG. 4, this diagram being equivalent to one presented on page 205 of Nikkei Electronics No. 21, November 1983 but with a different code configuration. The format in FIG. 4 begins with a preamble 1, the purpose of which is to simplify clock signal generation when the information is read. The preamble consists of a highly periodic pattern, such as repetitions of the pattern "100" Following the preamble 1 are synchronization fields 2 and data fields. Each of the data fields consists of a distinctive pattern used for synchronization of the data in the data fields. The data fields comprise digital information $3a$ and check symbols $3b$. The synchronization fields 2 are placed periodically throughout the data fields $3a$ and $3b$ as well at the beginning of the data. The configuration in FIG. 4 is segmented into 12-byte blocks, with a one-byte synchronization field 2 added to every block. In the information storage apparatus these fields are recorded in the following order: the preamble 1, a synchronization fields 2, then data bytes D1, D131, D261, D391, D2, D132, . . .

The data field is divided into four codewords extending in the horizontal direction in the drawing. One codeword P comprises 130 bytes of digital information $3a$ and 16 bytes of check symbols $3b$. A Reed-Solomon encoding scheme with Hamming distance 17 (146, 130, 17) is employed. The error correcting capability of a Reed-Solomon code can be described in terms of three parameters: E, the number of errors at unknown locations; F, the number of errors at known locations; and D, the Hamming distance. Errors in the encoded information can be corrected whenever the condition in Eq. (1) is satisfied:

$$F+2E<D \qquad (1)$$

usually, the location of the errors is unknown. Condition (1) then becomes:

$$2E<D \qquad (2)$$

In the present case which D=17, Eq. (2) implies that errors can be corrected at a maximum of 8 unknown locations.

Methods of error correction by (146, 130, 17) Reed-Solomon codes will not be described in detail here, but information can be found in U.S. Pat. No. 4,162,480 and in research publication PRL73-77 (January 1974) of the Institute of Electronics and Communication Engineers of Japan.

Consider now the effects of a defect in the storage medium, such as a defect contaminating the bytes marked X in FIG. 5, on the reproduction of information recorded in the format just described. The error A preventing the correct reproduction of data over an extended interval, leads to bit slip in the clock signals at the positions marked with triangles. This causes loss of data synchronization; that is, number of clock pulses does not match the quantity of data, causing data errors until the next synchronization field $2d$ is detected correctly. As as result, all the data marked with triangles are read incorrectly. Short errors such as the one at B do not cause bit slip. In the example shown in FIG. 5, error A causes a 7-byte error in each codeword P Unless means are provided for location the error A, equation (2) implies that this error uses up almost all of the code's error-correcting capability, leaving enough to correct an error in only one additional byte.

Bit slip thus poses a serious problem in the prior art of error correction, because it causes a large number of errors that must be corrected without accurate information as to their location, placing a considerable load on the error-correcting capability of the error-correcting code.

SUMMARY OF THE INVENTION

An object of the present invention is to alleviate this problem by identifying the location or errors caused by bit slip, thus providing an information storage apparatus capable of making more effective use of the error-correcting capability of an error-correcting code.

According to the invention, there is provided an information storage apparatus having an error-correcting code, wherein digital information and check symbols are stored in groups of codewords which are divided into blocks of equal size and a synchronization field for data synchronization is added to each block, the information storage apparatus comprising:

detection means for detecting errors in consecutive synchronization fields when the digital information is read;

flag-setting means for setting dropout flags when a signal from the detection means indicates and error in consecutive synchronization fields, the flags being set from the last synchronization that is correctly detected before the error up to the first synchronization field that is correctly detected after the error; and decoding means for decoding the codewords and correcting errors in them with reference to the dropout flags set by the flag-setting means.

According to this invention, successive errors in the synchronization fields are detected by the detection means, the correspoding locations in the reproduced codeword are identified as containing errors caused by bit slip, and dropout flags are set to mark these locations. The dropout flags enable more effective use to be made of the error-correcting correcting capability of the code.

DETAILED DESCRIPTION OF THE EMBODIMENT

Figure 1:
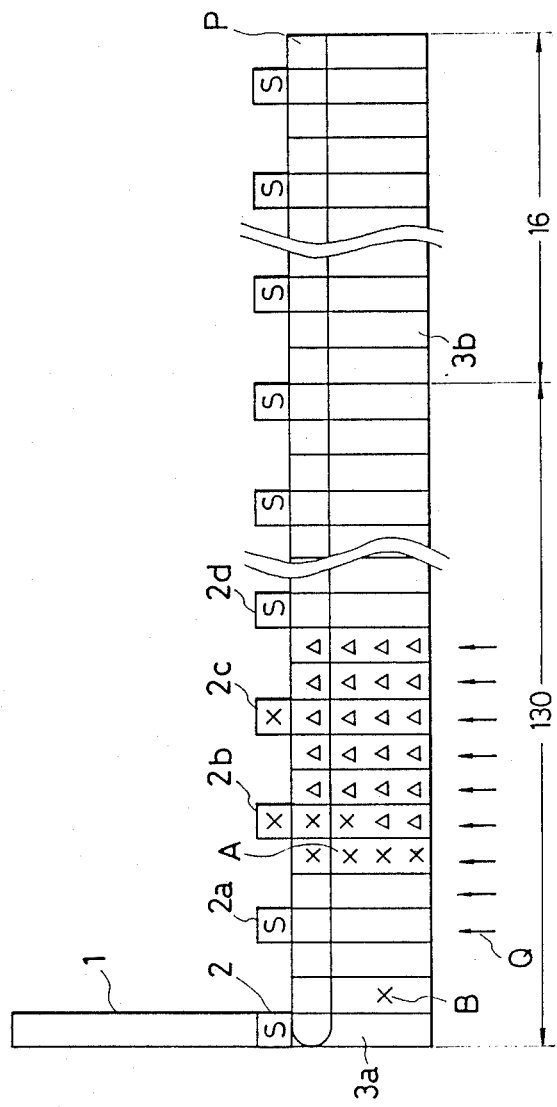
FIG. 1 shows a format of information used in an in formation storage apparatus accordig to the invention.

A preferred embodiment of this invention will next be described with reference to the drawings. FIG. 1 indicates the format in which digital information is recorded in an information storage apparatus according to this embodiment. The format comprises a preamble 1, synchronization fields 2, and a data field 3 containing the digital information 3a and check symbols 3b, which are similar to those shown in FIG. 4. synchronization fields 2 are added to each 12-byte block of data. The synchronization fields 2 added to four of the blocks shown in the drawing are marked 2a, 2b, 2c, and 2d. The data field 3 comprises codewords P encoded according to an error-correcting code. The arrows Q indicate locations at which dropout flags are set.

Figure 5:
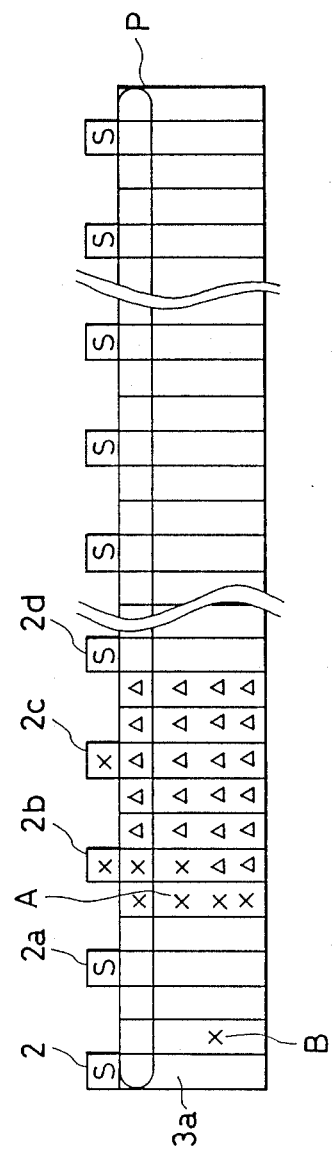
FIG. 5 shows errors in the information of the format shown in FIG. 4.

Suppose that the medium includes defects which cause errors at the sites marked X. Error A results in bit slip, while error B does not. When two consecutive sychronization such as 2b and 2c are in error, dropout flags Q are set from the locations at whcih the last synchronization field was correctly detected precedidng the error (synchronization field 2a in FIG. 1) up to the next correctly detected synchronization field (synchronization field 2d in FIG. 5). The dropout flags are used for correction of the errors.

Figure 2:
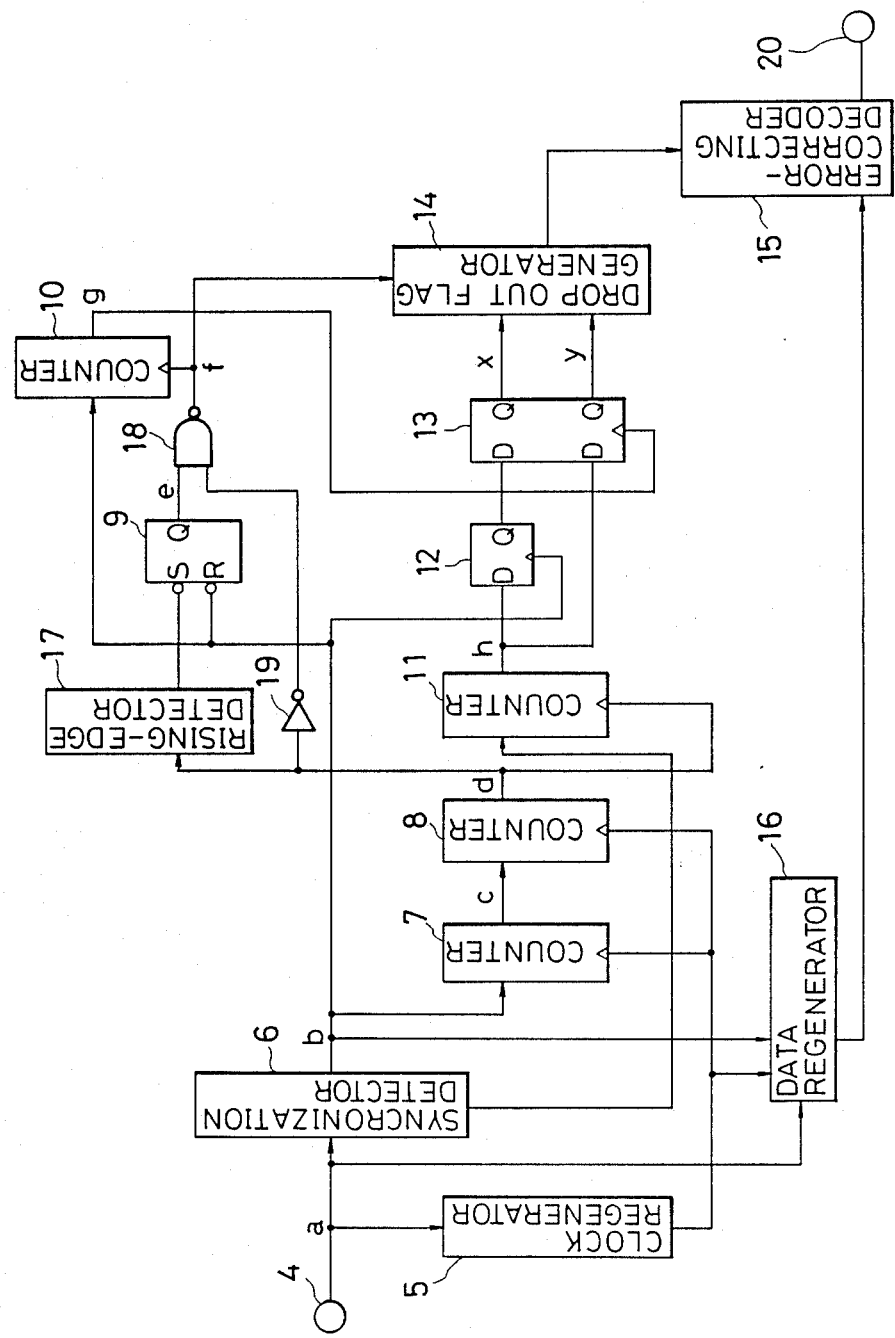
FIG. 2 is a block diagram showing an example of part of an information storage apparatus according to the invention.
Figure 3:
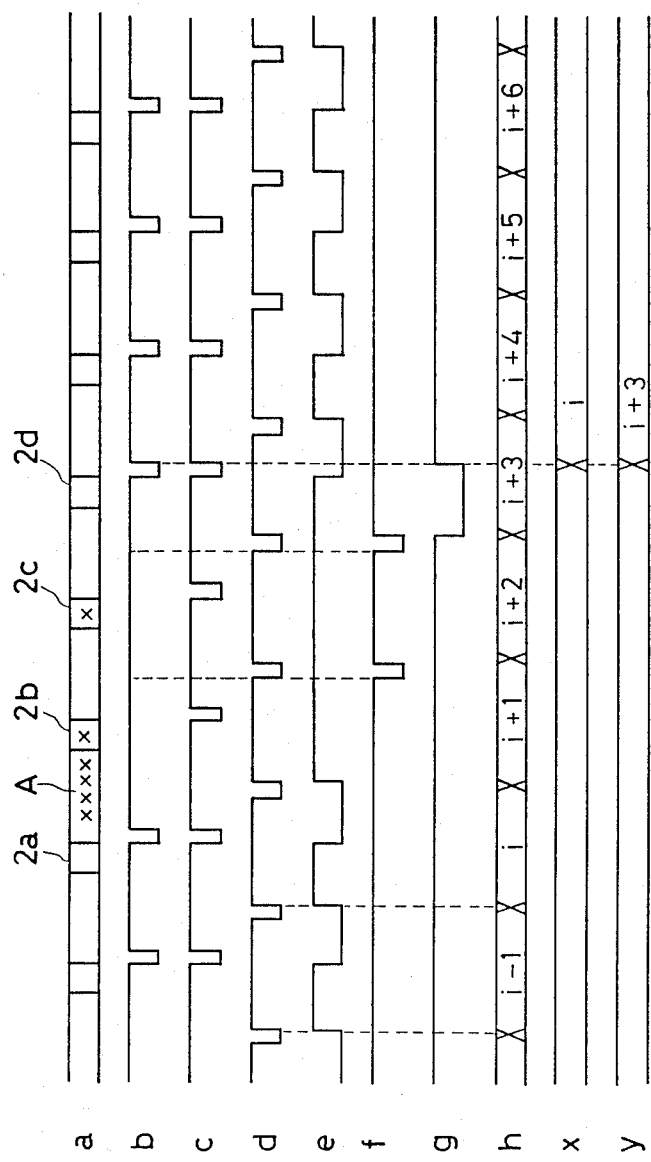
FIG. 3 is a time chart showing the signals appearing at various part of the circuit of FIG. 2.

FIG. 2 is a block diagram of the embodiment indicating the components by which it detects bit slip, sets dropout flags, and decodes the data. FIG. 3 is a timing diagram showing the outputs from the blocks in FIG. 2, the horizontal axis being a time axis.

Figure 4:
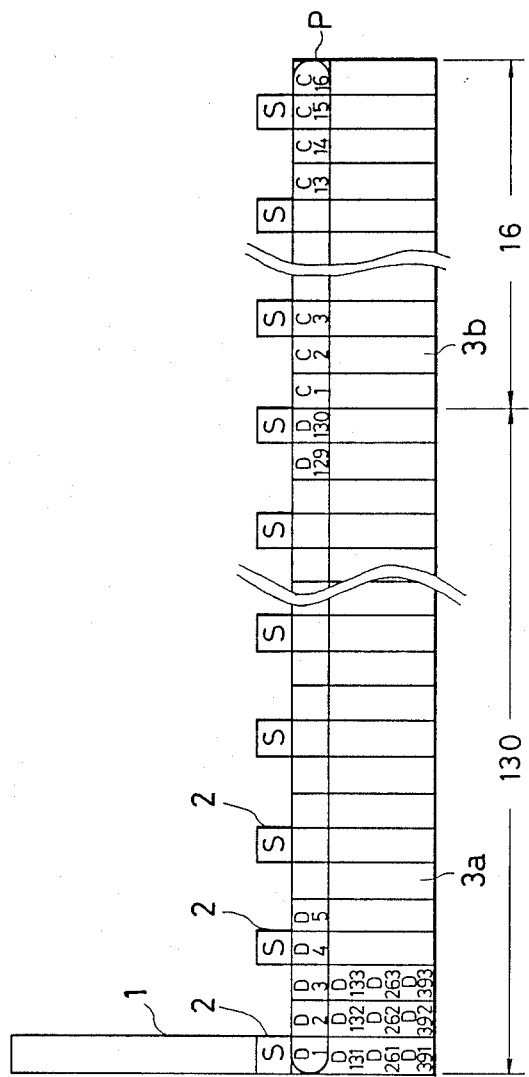
FIG. 4 shows a format of information used in a conventional information storage apparatus.

The components shown in FIG. 4 are an input terminal 4, a clock regenerator 5, a synchronization detector 6, a pair of counters 7 and 8, a flip-flop 9, another pair of counters 10 and 11, a pair of register 12 and 13, a dropout flag generator 14, an error-correcting decoder 15, a data regenerator 16, a rising-edge detector 17, a NAND gate 18, an inverter 19, and an output terminal 20. In the signal path from the input terminal 4 to the output terminal 20, the counter 10 provides detection means for detecting consecutive errors in the synchronization field, the dropout flag generator 14 provides flag-setting means for setting dropout flags in the interval between the correctly-detected synchronization fields preceding and following the error, and the error-correcting decoder 15 and the data regenerator 16 provide decoding means for decoding the codeword with reference to the dropout flags and correcting errors in it.

When digital information in read, the signal reproduced from the storage medium is received at the input terminal 4 and sent to the clock regenerator 5 and the synchronization detector 6. The clock regenerator 5 generates the clock pulses necessary in the decoding of the reproduced signal. The synchronization detector 6 detects the synchronization field 2 and generates a sync-detect signal b. The counter 7 counts the clock from the clock regenerator 5 and generates a "0" signal c when the count reaches a value corresponding to thirteen bytes, corresponding to the interval between synchronization fields or when the sync-detect signal b is produced, whichever is earlier. The counter 8 also counts the clock from the clock regenerator 5 and is set by the output c from the counter 7 and generates a "0" signal d after a fixed interval, approximately midway between the synchronization fields. Since the signal d is independent of the signal b, the signal d occurs even when the synchronization field 2 is not detected. The signal d is fed to the rising-edge detector 17 which generates a "0" pulse when it detects the rising edge of the signal d. This pulse and the sync-detect signal b control the filp-flop 9, which sets on the rising edge of the signal d and reset on input of the sync-detect signal b. The signals d and e combine to generate a pulse signal f that is output only at failure to detect the synchronizatiobn field 2. The counter 10 counts the pulse signals f anf generates a "0" output g when the count is at set value (two in FIG. 5) or higher. A sync-detect signal b resets the counter 10 so that its output reverts to "1". The cpunter 11 is reset when the synchronizations detector 6 detects the synchronization field 2 that immediately follows the preamble 1, counts occurrences of the signal d, and outputs a frame signal h indicating the original position of the current synchronization field 2 in the data field of the reproduced signal. The register 12 temporarily stores the frame number each time the synchronization field 2 is detected. the register 13 stores the frame numbers output by the register 12 and the counter 11 at the occurrence of a "0" signal g.

The output x of the register 13 is the frame number i corresponding to the last synchronization field 2 that is detected correctly before a bit slip error such as A. The output y of the register 13 is the frame number (i+3 in this case) corresponding to the first synchronization field 2 that is detected correctly after the bit slip error. Receiving these outputs x and y, the dropout flag generator 14 sets dropout flags Q for the data between the correctly-detected synchronization fields 2a and 2d surrounding the error, and sends the flag information to the error-correcting decoder 15. Meanwhile, the data regenerator 16 decodes the data field to "1" and "0" bits, using the sync-detect signal b and the clock pulses generated by the clock regenerator 5, and sends the restored signal to the error-correcting decoder 15. Receiving this restored signal, the error-correcting decoder 15 checks the dropout flags Q, corrects errors in the codeword, and sends the result to the output terminal 20, which can be connected to a device such as a computer. The error-correcting means in the error-correcting decoder 15 are the same as in the prior art and will not be described here.

As shown in FIG. 1, dropout flags Q are generated for a certain amount of correct data. Although flagging correct data as erroneous is a disadvantage from the standpoint of error correction, the disadvantage is outweighed by the advantage of having the incorrect data located by the dropout flag Q. In the example in FIG. 1, nine dropout flags are set for the error A, so F=9 and Eq. (1) becomes $9+2E<17$. This indicative that there is capability left to correct errors in up to three additionally bytes of unknown location (E=3). If no dropout flags Q were set, so that the error-correcting capability was given by equation (2), there would only be enough capability left to correct one additional byte.

The example just given illustrates the general principle that since bit slip leads to a concentration of errors, identifying the location of a bit slip is an effective way to enhance the error-correcting capability of an error-correcting code. Conversely, an error in an isolated synchronizarion field is unlikely to be a symptom of bit slip, so there is no need to sorround such an error with dropout flags.

The embodiment just described was arranged to detect errors in two or more consecutive synchronization fields, but in systems that can tolerate fairly long errors without incurring bit splip, the number of consecutive synchronization fields that must be in error for bit slip to be detected can be set to three or a higher number. The required number can be easily changed by adjusting the counter 10.

Various other alterations can be made to the foregoing embodiment without departing from the scope of this invention. For example, a method other than frame numbers can be used to set the dropout flags.

In summary, in an information storage apparatus employing an error-correcting code in which the recorded information comprises groups of codewords consisting of digital information and check symbols, and the codewords are divided into blocks of equal size, each block also having a synchronization field for data synchronization, this invention enhances the effectiveness of the error-correcting code by identifying the location of bit-slip errors. Bit slip errors are detected as errors in consecutive synchronization field and are marked with dropout flags, which are set from the last synchronization field detected correctly before the bit-slip error to the first synchronization field detector correctly after the bit-slip error. Knowing the location of the bit slip, the decoder can more effecienlty correct the errors.

What is claimed is:

1. An information storage apparatus for retrieving digital information having an error-correcting code, said digital information together with check symbols being stored in groups of codewords which are divided into blocks of equal size, said blocks further including a synchronization field for data synchronization, the information storage apparatus comprising:
   detection means for detecting errors in the synchronization fields of consecutive blocks when the digital information is read;
   flag-setting means for setting dropout flags when a signal from the detection means indicates the occurrence of an error in synchronization fields of consecutive blocks, the flags being set for every block from which the last synchronization field is correctly detected before the error up to the block where the first synchronization field is correctly detected after the error; and
   decoding means for decoding the codewords and correcting errors in them with reference to the dropout flags set by the flag-setting means.

2. An information storage apparatus as set forth in claim 1, wherein the flag-setting means sets dropout flags when the number of consecutive blocks having synchronization fields that are in error is equal to or greater than a preset value.

* * * * *